(12) United States Patent  
Poledna

(10) Patent No.: US 9,164,852 B2  
(45) Date of Patent: Oct. 20, 2015

(54) SYSTEM ON CHIP FAULT DETECTION

(71) Applicant: FTS Computertechnik GmbH, Vienna (AT)

(72) Inventor: Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 0 days.

(21) Appl. No.: 14/281,665

(22) Filed: May 19, 2014

(65) Prior Publication Data

US 2014/0258776 A1    Sep. 11, 2014

Related U.S. Application Data

(63) Continuation of application No. 13/383,011, filed as application No. PCT/AT2010/000248 on Jul. 7, 2010, now Pat. No. 8,732,522.

(30) Foreign Application Priority Data

Jul. 9, 2009  (AT) ............................. A 1077/2009

(51) Int. Cl.  
*G06F 11/00* (2006.01)  
*G06F 11/16* (2006.01)  
*G06F 11/07* (2006.01)  
*G06F 11/30* (2006.01)

(52) U.S. Cl.  
CPC ........ *G06F 11/1641* (2013.01); *G06F 11/0721* (2013.01); *G06F 11/0751* (2013.01); *G06F 11/3051* (2013.01)

(58) Field of Classification Search  
CPC ............ G06F 11/0751; G06F 11/0721; G06F 11/3051  
See application file for complete search history.

(56) References Cited

U.S. PATENT DOCUMENTS

| | | | |
|---|---|---|---|
| 7,007,099 B1 * | 2/2006 | Donati et al. | ................. 709/237 |
| 7,606,190 B2 * | 10/2009 | Markovic et al. | ............. 370/328 |
| 8,732,522 B2 | 5/2014 | Poledna | |
| 2012/0124411 A1 | 5/2012 | Poledna | |

OTHER PUBLICATIONS

International Search Report for International Application PCT/AT2010/000248, completed Nov. 15, 2010, 15 pgs.  
Huber et al., "A Resource Management Framework for Mixed-Criticality Embedded Systems", Industrial Electronics, Nov. 10, 2008, pp. 2425-2431.  
Kopetz et al., "Automotive Software Development for a Multi-Core System-on-a-Chip", Software Engineering for Automotive Systems, May 1, 2007, 8 pgs.

(Continued)

*Primary Examiner* — Charles Ehne  
(74) *Attorney, Agent, or Firm* — KPPB LLP

(57) ABSTRACT

The invention relates to a method for fault identification in a System-on-Chip (SoC) consisting of a number of IP cores, wherein each IP core is a fault containment unit, and where the IP cores communicate with one another by means of messages via a Network-on-Chip, and wherein an excellent IP core provides a TRM (Trusted Resource Monitor), wherein a faulty control message which is sent from one non-privileged IP core to another non-privileged IP core is identified and projected by an (independent) fault container unit, as a result of which this faulty control message cannot cause any failure of the message receiver.

9 Claims, 1 Drawing Sheet

(56) References Cited

OTHER PUBLICATIONS

Obermaisser et al., "Transient-Resilient System-on-a-Chip Architecture with Support for On-Chip and Off-Chip TMR", Dependable Computing Conference 2008, May 7, 2008, pp. 123-134.
International Search Report for International Application PCT/AT2010/000248, completed Nov. 15, 2010, 15 pages.
Huber et al., "A Resource Management Framework for Mixed-Cirticality Embedded Systems", Industrial Electronics, Nov. 10, 2008, pp. 2425-2431.
Kopetz et al., "Automotive Software Development for a Multi-Core System-on-a-Chip", Software Engineering for Automotive Sytems, May 1, 2007, 8 pages.

\* cited by examiner

SYSTEM ON CHIP FAULT DETECTION

RELATED APPLICATIONS

This application is a continuation of U.S. application Ser. No. 13/383,011 filed Feb. 2, 2012, which application was a 35 U.S.C. 371 national stage application corresponding to PCT/AT2010/000248 filed Jul. 7, 2010, which itself claims priority to Document Reference No. A 1077/2009 filed on Jul. 9, 2009 in Austria. Each of the above-referenced documents is incorporated by reference herein.

FIELD OF THE INVENTION

The present invention relates to a method and to a device for improving the reliability of a system on chip in an embedded computer system.

The invention in particular relates to a method for detecting errors in a system on chip (SoC) comprising a number of IP cores, wherein each IP core is a fault containment unit and wherein the IP cores communicate with each other via a network on chip by means of messages, and wherein an outstanding IP core implements a trusted resource monitor (TRM).

BACKGROUND

A system on chip (SoC) is a system in which the majority of system functions are integrated on a single piece of silicon. According to Pollack's rule (Borkar, S. (2007) Thousand-Core Chips, A Technology Perspective, Proc. of the 44.sup.th ACM IEEE Design Automation Conference, p. 746-749, ACM Press, New York), powerful SoCs are composed of a number of IP cores that communicate via a network on chip. An IP core is a hardware/software component that fulfills a predefined function. IP cores can communicate either by the access of the IP cores to a common memory or by means of messages. The application PCT/AT 2009/00207 presents an SoC architecture in which the IP cores communicate exclusively by means of messages.

SUMMARY OF THE INVENTION

It is the object of the present invention to prevent a faulty IP core of an SoC to cause another IP core that is not directly affected by the error from failing.

It is therefore the object of the present invention to prevent an error of an IP core from propagating to another IP core that is not directly affected by the error in a system on chip (SoC) in which a plurality of components (IP cores) communicate exclusively by means of messages. This object is achieved in that a faulty control message, which is sent from a non-privileged IP core to another non-privileged IP core, is detected and discarded by a fault containment unit (that is independent by definition), so that this faulty control message cannot cause failure of the message receiver.

Any message of an IP core that may trigger a failure of another IP core can be checked, and optionally discarded, by a third IP core so as to prevent this faulty message being sent by a faulty IP core from effecting the failure of another IP core.

Special advantages are attained when each control message, which is to be sent by a non-privileged IP core to another non-privileged IP core, is first sent to a third IP core, wherein this third IP core checks the message, and wherein the message is forwarded by this third IP core to the intended final receiver if the message is not faulty.

The checking IP core can classify a message as faulty if the evaluation of an assertion known a priori to the checking IP core has the value 'faulty'.

The third IP core is advantageously the TRM.

It is further advantageous for the TRM to forward messages only from a sender that is authorized to send a control message to the IP core listed in the message.

In addition, it may be provided that only the TRM can send a control message to the technology-dependent interface (TII) of a non-privileged IP core.

It is useful if each control message must be sent to the TII of an IP core.

It may also be provided that at least three messages, each from a different IP core, must be sent to the TRM within a predefined time interval, and the receiving TRM checks whether at least two of the three messages contain the same command, before this message is forwarded to the TII of the addressed IP core.

It may further be provided that at least three messages, each from a different SoC, must be sent to the TRM within a predefined time interval, and the receiving TRM checks whether at least two of the three messages contain the same command, before this message is forwarded to the TII of the addressed IP core.

It is useful for the functions of the privileged subsystem, which comprises the TRM, the network on chip and the network interfaces, to be safeguarded by error-correcting codes.

The invention further relates to a device for carrying out a method described above, wherein one or more, or all, method steps are performed directly in the hardware of the SoC.

The aforementioned object and other novel properties of the present invention will be described in the accompanying drawings.

DETAILED DESCRIPTION

The following section shows an implementation of the novel method based on a possible example of an SoC comprising eight IP cores.

Figure 1:
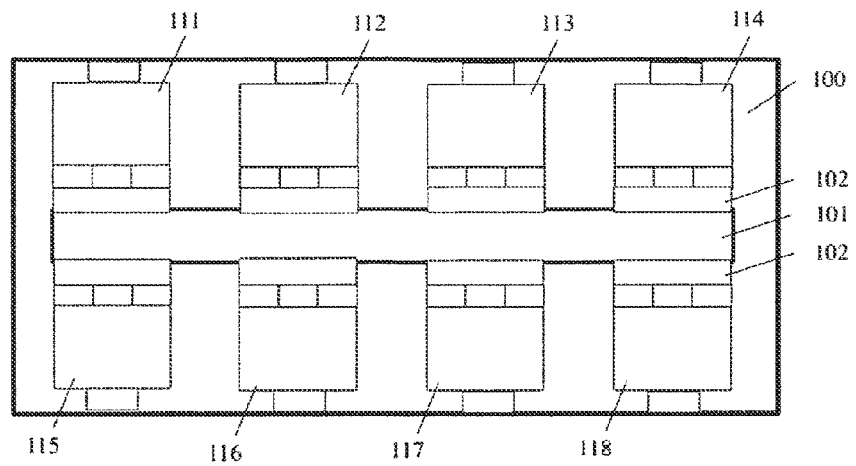
FIG. 1 shows the design of a system on chip (SoC).

FIG. 1 shows an SoC 100 comprising the eight IP cores 111, 112, 113, 114, 115, 116, 117 and 118. These eight IP cores can exchange messages via a network on chip 101. Each IP core, for example IP core 114, is connected to the NoC 101 via a network interface (NI) 102. One of these eight IP cores, for example IP core 111, is a privileged IP core, which is referred to as the trusted resource monitor (TRM), while the remaining seven IP cores 112, 113, 114, 115, 116, 117 and 118 are non-privileged IP cores. The TRM 111, the network on chip 101 and the eight network interfaces 102 form the privileged subsystem of the SoC 100. An error in this privileged subsystem can result in failure of the entire SoC. According to the invention, the functions of the privileged subsystem should thus be safeguarded by special error protection measures, such as the use of error-correcting codes, for example. Appropriate error-correcting codes can detect and correct transient and permanent hardware errors in the privileged system.

Each of the seven non-privileged IP cores forms a dedicated fault containment unit (FCU) (Kopetz, H. (1997). Real- Time Systems, Design Principles for Distributed Embedded Applications; ISBN: 0-7923-9894-7. Boston. Kluwer Academic Publishers.), which is to say the consequences of a random software error or hardware failure within a non-privileged IP core can directly interfere only with the functions of the respective IP core, however they can affect the functions of the other IP cores only indirectly by way of faulty messages. If it is possible to detect and discard faulty messages, the indirect consequences of an IP core error cannot propagate. PCT/AT 2006/00278 describes an architecture in which time errors of IP core messages are detected and discarded by the privileged network interface (NI) 102 of the NoC 101. According to PCT/AT 2009/00207 (WO 2009/140707), only the TRM 111 is allowed to write time parameters to the NI 102 so as to prevent a faulty IP core from independently modifying the transmission parameters of a message. The method as described in PCT/AT 2006/00278, however, does not prevent control messages with incorrect content from being sent from a non-privileged faulty IP core to the other non-privileged IP cores.

Figure 2:
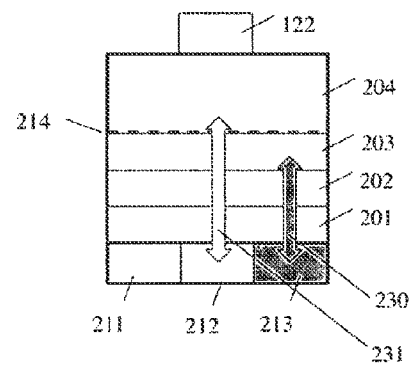
FIG. 2 shows the structure of an IP core of an SoC.

FIG. 2 shows the design of a non-privileged IP core, for example IP core 114. This IP core has four external interfaces: 211, 212, 213 and 122. The three message interfaces 211, 212 and 213 are connected to the network interface (NI) 102 of FIG. 1. The interface 122 is a local interface of the IP core, via which a connection to the exterior of the SoC 100 is implemented. This interface 122 can, for example, be an input/output network (for example a CAN network) or a wireless connection to the surroundings of the SoC 100.

The message interface 211 is referred to here as the linking interface (LIF) of the IP core 114. The services of the IP core 114 are offered to the seven other IP cores of the SoC 100 via the LIF 211.

The message interface 212 is referred to here as the technology-dependent interface (TDI), which allows the maintenance technician to communicate with the internal functions of the IP core 114. Because the format and the content of these TDI messages depend on the specific implementation technology of the IP core, this interface is implementation-dependent.

The message interface 213 is referred to here as the technology-independent interface (TDI). The configuration and the flow control of the IP core 114 are implemented via this TII 213 by means of control messages. A control message is a message that controls the flow of the computation in an IP core. For example, a hardware reset of the entire IP core 114 is prompted by means of control messages, or the start of a program execution or scheduling of a program execution of the IP core 114 is ordered. Moreover, the configuration or a reconfiguration of the SoC can be initiated by means of control messages. A faulty control message that is sent to the TII of the IP core may bring about the failure of the IP core 114, for example when during the correct operation of the IP core 114 suddenly a faulty hardware reset message is received at the TII 213. FIG. 2 also shows the inner design of the IP core 114. The IP core hardware, which carries out the software loaded in the IP core 114, is located at the lowest level 201. The IP core internal operating system is located on the next level 202, and the IP core internal middleware is located on the level 203. Finally, the application software is located on level 204. The IP core internal interface 214 between the middleware 203 and the application software 204 is referred to as the application program interface (API) 214. The messages that are received via the TII 213 communicate either directly with the IP core hardware 201 (for example a reset message), with the operating system 202 (for example a control message for scheduling a process), or the middleware 203, however not with the application software 204. The application software of a non-privileged IP core is thus not able to detect faulty control messages that arrive via the TII 213.

Figure 3:
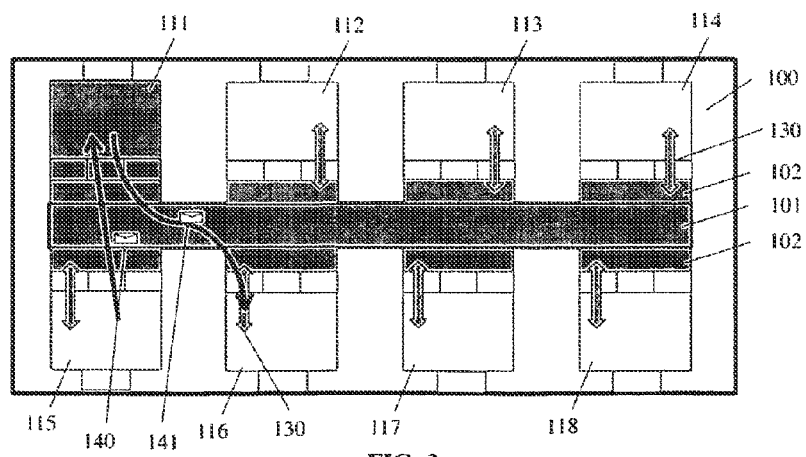
FIG. 3 shows the transmission of a control message from an IP core to another IP core of an SoC.

FIG. 3 shows the transmission of a control message to the TII of a non-privileged IP core. If, for example, the IP core 115 wants to send a reset message 140 to the IP core 116, according to the invention it must first send this message 140 to an independent third IP core, the TRM 111. The TRM 111 checks whether the message 140 is faulty. This check is carried out based on assertions that must be known a priori to the TRM. These assertions can relate to the state of the overall system, to the identity of the sender, the time of the message and the content of the message. If all assertions evaluated by the TRM are correct, the TRM sends the reset message 141 to the TII of the IP core 115. According to the invention, the architecture must assure that only the (privileged) TRM 111 is in a position to send messages to the TII of a non-privileged IP core. The implementation of a non-privileged IP core must assure that control messages (such as the reset message, for example) that could result in failure of an IP core can be received only via the TII. It is therefore not possible according to the invention for a non-privileged IP core to directly send a control message to another non-privileged IP core.

In a security-relevant system, the fault detection of the control messages by means of assertions may be considered to be insufficient. In such a system, three parallel operating IP cores must compute the control commands, which are embedded in the control messages. The TRM compares these three control messages and does only forward a corresponding message to the TII of the receiver, if at least two of these messages are identical. This masks any error in one of the three sending IP cores. In highly reliable systems, these three parallel control messages must originate from three independent SoCs so as to prevent common mode failure that may occur within an individual SoC.

The present invention significantly improves the reliability of an SoC because it prevents a faulty IP core from causing the failure of another IP core. Fault detection in the receiving IP core is not useful because the receiving IP core cannot correctly perform its own fault detection in the event of failure.

The specific implementation of the invention described here constitutes only one of many implementation options of the present invention.

The invention claimed is:

1. A system on chip (SoC) comprising:
   a number of non-privileged IP cores configured to communicate using messages via a network on chip, each non-privileged IP core being a fault containment unit, and
   a privileged IP core that is a fault containment unit and a trusted resource monitor (TRM),
   wherein a faulty control message that is sent from a non-privileged IP core to another non-privileged IP core is detected and discarded by the privileged IP core so that this faulty control message cannot cause failure of the message receiver.

2. The SoC of claim 1, wherein:
   each control message sent by a non-privileged IP core to another non-privileged IP core is first sent to the privileged IP core, and the privileged IP core checks the message, and
   the message is forwarded by the privileged IP core to the intended final receiver when the message is not faulty.

3. The SoC of claim 1 wherein the privileged IP core can classify a message as faulty when the evaluation of an assertion known a priori to the checking IP core has the value 'faulty'.

4. The SoC of claim 1, wherein the privileged IP core forwards messages only from a sender that is authorized to send a control message to the IP core listed in the message.

5. The SoC of claim 1, wherein:
   the non-privileged IP cores include a technology-dependent interface (TII); and
   only the TRM can send a control message to the technology-dependent interface (TII) of a non-privileged IP core.

6. The SoC of claim 5, wherein each control message must be sent to the TII of a non-privileged IP core.

7. The SoC of claim 6, wherein at least three messages, each from a different non-privileged IP core, must be sent to the privileged IP core within a predefined time interval, and the receiving privileged IP core checks whether at least two of the three messages contain the same command, before this message is forwarded to the TII of the addressed non-privileged IP core.

8. The SoC of claim 7, wherein at least three messages, each from a different SoC, must be sent to the privileged IP core within a predefined time interval, and the receiving privileged IP core checks whether at least two of the three messages contain the same command, before this message is forwarded to the TII of the addressed non-privileged IP core.

9. The SoC of claim 1, wherein the functions of the privileged subsystem, which comprises the privileged IP core, the network on chip and the network interfaces, are safeguarded by error-correcting codes.

\* \* \* \* \*